United States Patent
LeFebvre et al.

(10) Patent No.: US 10,710,619 B2
(45) Date of Patent: Jul. 14, 2020

(54) TRAIN AND RAIL YARD MANAGEMENT SYSTEM

(71) Applicant: Amsted Rail Company, Inc., Chicago, IL (US)

(72) Inventors: William LeFebvre, West Chester, PA (US); Matthew Bonnes, Malvern, PA (US); Darren Dragish, Downingtown, PA (US); Andrew Martin, West Chester, PA (US); Edward J. Mansfield, Blue Bell, PA (US)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

(21) Appl. No.: 15/166,933

(22) Filed: May 27, 2016

(65) Prior Publication Data

US 2016/0272228 A1    Sep. 22, 2016

Related U.S. Application Data

(63) Continuation-in-part of application No. 15/039,706, filed as application No. PCT/US2014/067739 on Nov. 26, 2014, now Pat. No. 10,259,477.
(Continued)

(51) Int. Cl.
| | |
|---|---|
| B61L 27/00 | (2006.01) |
| B61L 25/02 | (2006.01) |
| H04L 29/08 | (2006.01) |
| B61L 15/00 | (2006.01) |
| B61L 17/00 | (2006.01) |

(Continued)

(52) U.S. Cl.
CPC ....... *B61L 27/0005* (2013.01); *B61L 15/0027* (2013.01); *B61L 17/00* (2013.01); *B61L 25/025* (2013.01); *B61L 25/028* (2013.01); *B61L 25/04* (2013.01); *B61L 27/0011* (2013.01); *B61L 27/0077* (2013.01); *B61L 27/0083* (2013.01); *B61L 27/0094* (2013.01);
(Continued)

(58) Field of Classification Search
CPC .. B61L 27/0094; B61L 15/0027; B61L 17/00; B61L 15/0072; B61L 25/025; B61L 25/028; B61L 27/0077; B61L 27/0083; B61L 2205/04; H04L 67/12
See application file for complete search history.

(56) References Cited

U.S. PATENT DOCUMENTS

| | | |
|---|---|---|
| 5,682,139 A | 10/1997 | Pradeep et al. |
| 5,691,980 A | 11/1997 | Welles, II et al. |

(Continued)

FOREIGN PATENT DOCUMENTS

WO    01/015001 A2    3/2001

OTHER PUBLICATIONS

Australian Government—Examination report No. 1 for standard patent application—dated Feb. 19, 2018, related to the subject U.S. application.

(Continued)

*Primary Examiner* — Hunter B Lonsberry
*Assistant Examiner* — Mathew Franklin Gordon
(74) *Attorney, Agent, or Firm* — Fox Rothschild LLP

(57) ABSTRACT

A rail yard management system that takes advantage of infrastructure installed in rail yards and on railcars to allow the management of the railcars within a rail yard. The invention is also applicable to yard management for vehicles other than railcars.

20 Claims, 6 Drawing Sheets

Related U.S. Application Data

(60) Provisional application No. 61/909,899, filed on Nov. 27, 2013.

(51) Int. Cl.
    *B61L 25/04*     (2006.01)
    *B61K 9/04*     (2006.01)

(52) U.S. Cl.
    CPC ............... *H04L 67/12* (2013.01); *B61K 9/04* (2013.01); *B61L 2201/00* (2013.01); *B61L 2205/04* (2013.01)

(56) References Cited

U.S. PATENT DOCUMENTS

| | | |
|---|---|---|
| 6,487,478 B1 | 11/2002 | Azzaro et al. |
| 6,668,216 B2 | 12/2003 | Mays |
| 7,688,218 B2 | 3/2010 | LeFebvre et al. |
| 8,672,273 B2 | 3/2014 | Brown et al. |
| 8,751,290 B2 | 6/2014 | Schullian et al. |
| 9,365,223 B2 | 6/2016 | Martin et al. |
| 9,744,980 B2 | 8/2017 | Henry et al. |
| 2004/0117076 A1 | 6/2004 | Horst |
| 2005/0259619 A1 | 11/2005 | Boettle et al. |
| 2006/0264221 A1 | 11/2006 | Koike et al. |
| 2007/0156307 A1 | 7/2007 | Muinonen et al. |
| 2007/0208841 A1* | 9/2007 | Barone ............... B61L 15/0027 709/223 |
| 2008/0154692 A1* | 6/2008 | Logan ................... B61L 17/00 701/19 |
| 2008/0195265 A1 | 8/2008 | Searle et al. |
| 2009/0173840 A1 | 7/2009 | Brown et al. |
| 2009/0299550 A1* | 12/2009 | Baker ................. B61L 15/0027 701/2 |
| 2010/0200307 A1* | 8/2010 | Toms .................. G01G 19/042 177/163 |
| 2010/0302974 A1 | 12/2010 | Niiyama et al. |
| 2011/0270475 A1 | 11/2011 | Brand et al. |
| 2012/0051643 A1 | 3/2012 | Ha et al. |
| 2012/0072266 A1 | 3/2012 | Schullian et al. |
| 2012/0303237 A1* | 11/2012 | Kumar .................... B61L 3/006 701/93 |
| 2013/0006451 A1* | 1/2013 | Cooper ................... B61L 3/006 701/19 |
| 2013/0270396 A1 | 10/2013 | Agostini |
| 2014/0089243 A1 | 3/2014 | Oppenheimer |
| 2014/0372498 A1* | 12/2014 | Mian .................. B61L 15/0027 709/201 |
| 2014/0375497 A1 | 12/2014 | Friend et al. |
| 2015/0060608 A1 | 3/2015 | Carlson et al. |
| 2015/0148984 A1 | 5/2015 | Padulosi et al. |
| 2016/0325767 A1 | 11/2016 | LeFebvre et al. |
| 2017/0021847 A1 | 1/2017 | LeFebvre et al. |

OTHER PUBLICATIONS

European Patent Office—Extended Search Report dated Oct. 23, 2017, issued in EU application 14865427.0, which is related to the subject U.S. application.

\* cited by examiner

TRAIN AND RAIL YARD MANAGEMENT SYSTEM

RELATED APPLICATIONS

This application is a continuation-in-part of U.S. application Ser. No. 15/039,706 filed May 26, 2016, which is a national phase of International Application PCT/US2014/067739 filed Nov. 26, 2014, which claims the benefit of U.S. provisional application 61/909,899, filed Nov. 27, 2013, the disclosures of each of them are hereby incorporated herein by reference.

FIELD OF THE INVENTION

The present invention relates to a sensing system and, more particularly, to a sensing system that monitors various characteristics, parameters and locations of railcars and locomotives in a train formation, also known as a train or a train consist, as well as unassociated railcars and locomotives in a rail yard through the use of one or more wireless mesh communication networks.

BACKGROUND OF THE INVENTION

It has become more important for railway owners and operators to be able to monitor and locate assets, including railcars, locomotives and trains on a real time basis.

From a safety point of view, it is important to monitor various operational parameters of railcars, for example, bearing temperature, in real time, to be able to predict and stop impending failures, which could result in severe consequences, such as derailment. It is also important to be able to raise alerts of such conditions, and to communicate these operational parameters relating to alerts to an on-board operator or a remote railroad operations center, such that action to mitigate any unsafe conditions can be taken in a timely manner.

From an operational point of view, it is important for railway operators to determine whether a railcar is in a train consist outside of a rail yard, in a train consist in a rail yard, or if a railcar is in a loaded or unloaded condition. The significance of knowing the status of railcars allows an operator to determine if railcars are being utilized or idle at any given point in time and makes it easier to manage rail yard operations.

As current industry practice, the management of train consists and train yards in railroad operations relies on reading, at fixed points in the rail network, passive radio frequency identification (RFID) tags which are affixed to each railcar. While this method has provided railroad operators with significant increases in performance, it lacks the benefits of a dynamic wireless network capable of transmitting information and data, such as location and condition or performance data when not in range of an RFID reader. Further, the current system does not provide a mechanism to communicate operational alerts to the locomotive which allows the alerts to be actioned in a timely manner.

Given the demanding and harsh environments in which railroad trains operate, any monitoring system must be rugged, reliable and able to operate for long periods with little or no maintenance. In addition, to be cost effective, it should not add significant cost to install, maintain or operate the system. Because there are more than 1.5 million freight railcars in North America alone, a system of monitoring all railcars in use is highly desirable and, as such, the system needs to be scalable to handle a very large number of potential devices.

It is therefore desirable to provide a monitoring system that can be used while a train is operational, to monitor various operational parameters of the railcars and to communicate alert conditions to an on-board operator or off-train, and which also can be used when trains and/or railcars are in a rail yard to ease the management of assembling and de-assembling train consists.

SUMMARY OF THE INVENTION

Accordingly, it is an object of the present invention to provide a communication system for a railcar wherein the railcar is equipped with a communication management unit and one or more wireless sensors, which form a railcar-based mesh network overlaid on and localized to a railcar. The communication management unit supports multiple wireless sensors in a mesh network based on open standard protocols. The railcar-based mesh network architecture is a foundational building block of the IEC 62591 international wireless standard as well as the ISA100.11, a standard from the International Society of Automation.

The communication management unit provides a means for monitoring the output from a variety of wireless sensors attached to a railcar and determining the behavior and condition of the railcar and its various components based on an analysis of the data. The wireless sensors collect, store, analyze and process data, which is then transmitted to the communication management unit for further transmission to a locomotive where an engineer or automated system can act on the data, for transmission to a remote railroad operations center, or for processing and analysis to build alerts, events or reports. This provides regular assurance of proper performance and condition as well as necessary warnings of impending or actual failure in a timely and useful manner to the operators and owners of the railcars in a train consist.

Some of the operational parameters that are useful to monitor, include, but are not limited to roller bearing temperature, temperature of the commodity being carried, position of the hand brake, roller bearing adapter displacement, wheel condition, truck hunting/warp/binding, brake status and performance, load status and load amount, whether a partial derailment has occurred and potentially problematic track conditions.

It is a further object of the invention to provide a train-based mesh network overlaid on a train consist consisting of the communication management unit from each railcar in the consist and a powered wireless gateway on a host or control point, such as a locomotive.

Each railcar is equipped with a communication management unit which communicates with each of the wireless sensors deployed on the railcars. The communication management unit is capable of collecting data from each of the wireless sensors and performing higher-level analysis of the data to detect imminent or actual failures. During such data analysis, heuristics may be applied to determine potential failures based on statistical models and empirical data. The communication management unit also is capable of communicating both the data and the results of any analysis to another system remote from the railcar, via any one of a number of communication protocols.

The remote receiver may be located on the train for example, in a rail yard or at an off-train location at a remote railroad operations center. The remote receiver may also be able to perform higher-level analysis of the condition of the train by applying heuristics and statistical models to data, events and alerts collected from a plurality of communication management units, located on different railcars in the train. The analysis of the data collected can be carried out at any one of a plurality of different event engines distributed among the various components in the present invention, including the sensor units, communication management units, train-based or land-based powered wireless gateways, or other land-based stations. The event engine is used to determine state changes and actions to perform on the device from a plurality of inputs internal or external of the system. The logic used to determine an outcome is based on a set of rules which can be configured and updated remotely.

Therefore, it is an objective of this invention to provide a comprehensive system which allows the collection of data and the analysis of that data to predict operational failures and to provide adequate warnings of those failures to allow for intervention by humans or automated systems before catastrophic failures occurs. Such warnings can be ranked by high priority and normal priority. The system will move the high priority warnings to the front of the warning message queue for transmission. The normal priority warnings will follow a regular operational warning message algorithm.

It is a further object of the present invention to provide a train consist management system, where a rail yard-based mesh network is overlaid on a rail yard, and which consists of one or more powered wireless gateways installed in the rail yard which act as communication points and aggregators of data generated and transmitted by the mesh networks of each railcar in the rail yard. In addition, the powered wireless gateways in the rail yard manage consists and perform analysis of data from multiple monitored assets and systems.

The present invention also relates to a method of monitoring a rail yard wherein the location of a railcar within the rail yard is identified, the orientation of the railcar and the order of the railcar within a train consist are determined and validated. The order of a railcar in the train consist, the orientation or the railcars and/or the location of the car in the rail yard may be determined via several methods, including, but not limited to GNSS data (global navigations satellite system, such as GPS data, motion sensors, compass readings, RFID readings, acceleration sensors and relative signal strength indication (RSSI) to nearby nodes. The orientation of a railcar in the train consist is a critical element in the train consist. As is known in the industry, the end of a railcar is identified as either "A" or "B." Readings from a magnetometer or electronic compass and an accelerometer can be used to identify the orientation of the car. Additionally, orientation may be determined from the placement of system components on the railcar.

In another aspect, the invention provides a rail yard management system for managing one or more railcars within a rail yard, each of which railcars having a railcar-based mesh network overlaid thereon. This system includes a rail yard-based mesh network having one or more land-based wireless gateways deployed in the rail yard, and the system is configured for performing the following functions: (a) allowing one or more communication management units associated with the one or more railcars to become nodes in the rail yard-based mesh network when the railcars are within the rail yard; (b) collecting data from the one or more communication management units through the rail yard-based mesh network; and (c) determining the state of various operational parameters of the railcars from the collected data.

Methods for managing the rail yard and methods for managing a train, both of which are capable of being carried out by the systems described herein, are also provided.

BRIEF DESCRIPTION OF THE DRAWINGS

The following detailed description will be better understood when read in conjunction with the figures appended hereto. For the purpose of illustrating the invention, there is shown in the drawings a preferred embodiment. It is understood, however, that this invention is not limited to this embodiment or the precise arrangements shown.

DETAILED DESCRIPTION OF THE INVENTION

Figure 1:
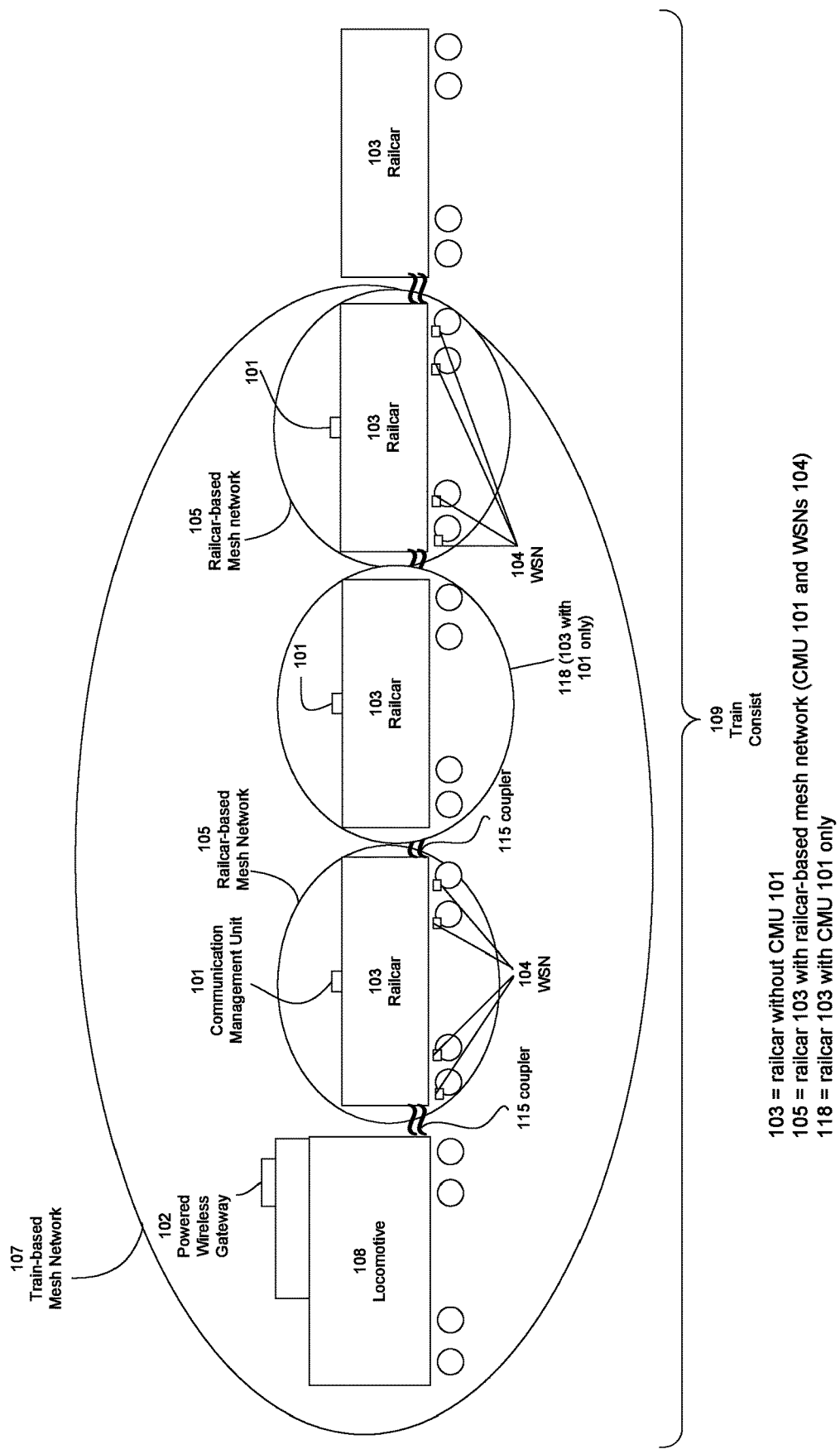
FIG. 1 is a perspective view of two railcars each equipped with a communication management unit and multiple wireless sensors nodes installed near the wheel bearings of the railcar, a railcar equipped with just a communication management unit without wireless sensor nodes attached, a railcar without a communication management unit and a locomotive having a powered wireless gateway device installed thereon, wherein the communication management unit and multiple wireless sensors installed on the railcars form a railcar-based mesh network and communicate with the powered wireless gateway device on a host or control point, such as a locomotive or other asset, forming the train-based mesh network.

A rail yard, shown in the drawings as reference number 114, is an area where locomotives and railcars are stored, sorted and assembled into train consists, where train consists are disassembled, and where locomotives and railcars may be fueled, processed, loaded, unloaded or maintained.

A train consist, shown in the drawings as reference number 109, is defined as a connected group of railcars 103 and locomotives 108.

A wireless sensor node ("WSN"), shown in the drawings as reference number 104, is located on a railcar 103, is deployed preferably in a self-contained, protective housing, and may include one or more sensors, a power source and communication circuitry which allows the WSN 104 to communicate with the CMU 101 in the railcar-based mesh network. The WSN 104 may also include an intelligent capability to analyze the data collected from the sensors and to determine if the data needs to be transmitted immediately, held for later transmission, or aggregated into an event or alert. The WSN 104 is used for sensing a parameter to be monitored (e.g. temperature of bearings or ambient air) or status (e.g., position of a hatch or hand brake). All WSNs 104 on a single railcar 103 form a railcar-based mesh network 105 controlled by a communication management unit 101. Examples of WSNs 104 are disclosed in published U.S. patent application 2013/0342362, the disclosure of which is hereby incorporated by reference herein.

A communication management unit ("CMU"), shown in the drawings as reference number 101, is located on a railcar 103 and controls the railcar-based mesh network 105 overlaid on railcar 103. The CMU 101 hardware preferably includes a processor, a power source (e.g. a battery, solar cell or internal power-generating capability), a global navigation satellite system device such as a global positioning system ("GPS") receiver, Wi-Fi, satellite, and/or cellular capability, a wireless communications capability for maintaining the railcar-based mesh network 105 and, optionally, one or more sensors, including, but not limited to, an accelerometer or temperature sensor. The CMU 101 supports one or more WSNs 104 in a mesh network configuration using open standard protocols, such as the IEEE 2.4 GHz 802.15.4 radio standard. Additionally, the CMU 101 is also a member of a train-based mesh network 107, which consists of the CMUs 101 from all enabled railcars 103 in the train consist 109, controlled by a powered wireless gateway 102, typically located on a locomotive 108 or is a member of a rail yard-based mesh network 117, controlled by one or more powered wireless gateways 116 dispersed throughout the rail yard 114. The CMU 101 thus supports four functions: 1) to manage a low-power railcar-based mesh network 105 overlaid on a railcar 103; 2) to consolidate data from one or more WSNs 104 in the railcar-based mesh network 105 and to apply logic to the data gathered to generate warning alerts to a host such as a locomotive 108 or remote railroad operations center 120; 3) to support built-in sensors, such as an accelerometer, within the CMU 101 to monitor specific attributes of the railcar 103 such as location, speed, accelerations and more; and 4) to support bi-directional communication upstream to the host or control point, such as a locomotive 108 and/or an off-train monitoring and remote railroad operations center 120, and downstream to one or more WSNs 104, located on the railcar. CMUs 101 may communicate wirelessly to the PWG 102 in a mesh network configuration, or may be configured to communicate through a wired connection, for example, through the ECP (electronically controlled pneumatic) brake system. Those skilled in the art will appreciate that GPS is just one form of a global navigation satellite system (GNSS). Other types of GNSS include GLONASS and BeiDou with others in development. Accordingly, although GPS is used in the embodiments described herein, any type of GNSS system or devices may be used.

The CMU 101 is capable of receiving data and/or alarms from one or more WSNs 104 and is capable drawing inferences from this data or alarms regarding the performance of railcar 103, and of transmitting data and alarm information to a remote receiver. The CMU 101 is preferably a single unit that would serve as a communications link to other locations, such as a mobile base station 102 (e.g., the locomotive 108), a land-based base station 116, etc., and have the capability of processing the data received. The CMU 101 also communicates with, controls and monitors WSNs 104 in the local railcar-based mesh network 105.

A powered wireless gateway ("PWG"), shown in the drawings as reference number 102, is preferably located either on a locomotive 108 or deployed as part of a rail yard-based mesh network 117. It typically will include a processor, a GPS receiver, a satellite and or cellular communication system, local wireless transceiver (e.g. WiFi), an Ethernet port, a high capacity mesh network manager and other means of communication. The PWG 102 will have power supplied by the locomotive 108, if located on a powered asset, such as a locomotive 108, or will derive its power from another source, for example, from a solar power generator or from a high-capacity battery. The PWG 102 controls a train-based mesh network 107 overlaid on a train consist 109, consisting of multiple CMUs 101 from each railcar 103 in a train consist 109, isolated CMUs 101 that are not part of a train consist, or a rail yard-based mesh network 117 overlaid on a rail yard 114, consisting of land-based PWGs 116 and CMUs 101 from individual railcars 103 not currently associated with a train consist 109.

The components and configuration of the PWG 102 are similar to that of a CMU 101, with the exception that the PWG 102 draws power from an external source, while the CMU 101 is self-powered. Additionally, the PWG 102 collects data and draws inferences regarding the performance of the train consist 109, and train-based mesh network 107, as opposed to CMUs 101, which draw inferences regarding the performance of individual railcars 103 and railcar-based mesh network 105 or 118.

A dark railcar 103 is a railcar 103 equipped with a CMU 101 but which is not connected to or associated with either a train-based mesh network 107 or a rail yard-based mesh network 117, as defined below.

A train network ID ("TNID"), shown in the drawings as reference number 113, uniquely identifies a train-based mesh network 107 and is used during the formation of the train-based mesh network 107 when the train consist 109 is assembled.

A roaming network ID ("RNID"), shown in the drawings as reference number 112, uniquely identifies a rail yard-based mesh network 117 and is used to track assets (i.e., locomotives 108 and railcars 103) in a rail yard 114 and unassociated with a train consist 109.

A railcar-based mesh network shown in the drawings as reference number 105, consists of a CMU 101 on a railcar 103, which is part of and manages a railcar-based mesh network 105 of a plurality of WSNs 104, each deployed, preferably on the same railcar 103.

A train-based mesh network, shown in the drawings as reference number 107, consists of a powered PWG 102 on a locomotive 108, which is part of and manages a train-based mesh network 107 of a plurality of CMUs 101, each deployed on a railcar 103, wherein the locomotive 108 and plurality of railcars 103 form a train consist 109 and wherein the train-based mesh network 107 is identified by a unique TNID 113.

A rail yard-based mesh network, shown in the drawings as reference number 117, consists of one or more land-based PWGs 116 deployed at strategic locations in a rail yard 114 and, optionally, one or more CMUs 101, each deployed on a railcar 103 that may or may not be part of a railcar based network 105. A railcar 103 equipped with a CMU 101, is known as a monitored railcar 118, and a railcar 103 equipped with a CMU 101 and one or more WSN 104 is known as a railcar-based mesh network 105. When a monitored railcar 118 or railcar-based mesh network 105 is not associated or connected to a train based mesh network 107 with a TNID 113, they may connect to a rail yard-based mesh network 117 that is in range, using the RNID 112. The rail yard-based-mesh network 117 is identified by an RNID 112. A monitored railcar 118 or a railcar-based mesh network 105 can only connect to one network, using either the TNID or the RNID, at any given time.

The discussion which follows describes the system in the context of a railcar 103, however, it will be understood by one of skill in the art that the same methods are applicable to any railroad vehicle or asset. It should also be noted that the definitions above are not meant to be exclusive, in that defined components may have additional components or features not included in the definition. Furthermore, while the description which follows features a railcar 103 with two trucks (or bogies), it is applicable to any configuration with more or less trucks or axles.

Railcar-Based Mesh Network

Referring now to FIG. 1 of the drawings, a railcar-based mesh network is shown generally as reference number 105. Railcar-based mesh network 105 comprises a CMU 101 installed on a railcar 103 and one or more WSNs 104 installed on the same railcar 103. The railcar-based mesh network 105 architecture is a foundational building block of the IEC 62591 international wireless standard as well as the ISA100.11a standard from the International Society of Automation.

In one aspect, the invention provides a novel means for monitoring the performance and operation of a railcar 103 using a railcar-based mesh network 105 overlaid on the railcar 103, and communicating such performance and operational data to a host or control point such as a locomotive 108 of a train consist 109, as shown in FIG. 1. CMU 101, preferably mounted on a railcar 103, controls and retrieves data and alerts from one or more WSNs 104 also deployed on railcar 103. If a problem is detected, alarms are forwarded by CMU 101 for further action to a PWG 102 installed on an asset, preferably with access to a power source and, optionally, to an off train monitoring and remote railroad operations center 120.

The system provides the ability to receive event and status information from CMU 101 and one or more WSNs 104 installed on a railcar 103. Interfaces are registered to receive events asynchronously, or remote procedures can be called to retrieve information from the CMU 101 in a polling manner. The interface is exposed through a web service or library, and is accessible over the local area network 110 through an SSL connection and authenticated with a unique key reserved for each end user.

Referring still to FIG. 1, CMU 101 is affixed directly to the railcar 103 through any suitable means, for example, using self-tapping mounting screws or other metal mounting screws. An additional method of attaching CMU 101 to railcar 103 is to attach directly to a mounting bracket with screws or other metal mounting screws and the said bracket is attached directly to railcar 103 using self-tapping screws or other metal mounting screws. CMU 101 is able to configure one or a more WSNs 104 in a local mesh network to transmit, listen, or sleep at precise times.

CMU 101 on each railcar 103 is capable of supporting an optional global navigation satellite system (GNSS) sensor to determine location, direction and/or speed of railcar 103. Additionally, CMU 101 on each railcar 103 is capable of using built-in sensors and/or managing a railcar-based mesh network 105 on the railcar 103 to generate messages that need to be sent to a host or control point, such as a locomotive 108.

CMU 101 installed on railcar 103 collects data regarding the operation of the railcar 103 from one or more WSNs 104 installed on railcar 103. WSNs 104 transmit data to CMU 101. CMU 101 connects with train-based mesh network 107 overlaid on train consist 109 to transmit data to a powered wireless gateway 102 installed on locomotive 108.

WSNs 104 use a networking protocol designed to lower power consumption, having an integrated radio transceiver and antenna that is certified for operation in the license-free band. Each WSN 104 is equipped with an ultra-low power 32-bit microcontroller that allows sampling and extensive on-board computations, including fast Fourier transforms (FFTs), filtering, and trending. WSN 104 is powered by high energy density, low self-discharge lithium batteries. Each WSN 104 acts as a router that is capable of communicating with any other WSN 104 within communication range and assigned to the railcar-based mesh network 105, thereby creating redundant communication paths within the railcar-based mesh network 105.

WSNs 104 can be configured for the parameter or condition to be monitored, for example, the temperature of a wheel bearing, and can be placed on railcar 103 in a location chosen for such monitoring. WSN 104 can have one or multiple sensing devices sensing multiple operational parameters. For example, WSN 104 can include a temperature sensor to monitor wheel bearing temperature, a temperature sensor to measure ambient temperature and an accelerometer. WSN 104 is affixed directly to the railcar 103 by welding, self-tapping mounting screws or other metal mounting screws.

As an operational example, WSN 104 may sense the temperature of a wheel bearing by virtue of being attached by welding or other means near to the wheel bearing, preferably on the bearing fitting (which may include the bearing, bearing adapter or any other bearing related appendage). Exemplary WSNs 104 have been described in U.S. Published Patent Application 2013/0342362, which is hereby incorporated herein by reference.

Each WSN 104 includes circuitry for wireless communications. Preferably, each WSN 104 on a railcar 103 is formed into an ad-hoc railcar-based mesh network 105 with other WSNs 104 on the same railcar 103 and with CMU 101, also preferably mounted on the same railcar 103, as shown in FIG. 1. In the preferred embodiment, each WSN 104 of a given railcar 103 would transfer data or alerts to the CMU 101 of that railcar 103. This transfer of data may occur directly or the data may be relayed by other WSN 104 in the same railcar-based mesh network 105 to CMU 101. The ad-hoc railcar-based mesh network 105 is preferably formed using the Time Synchronized Mesh Protocol, a communications protocol for self-organizing networks of wireless devices. Other protocols may also be used.

WSNs 104 include a long-term power source, preferably a military grade lithium-thionyl chloride battery. The circuitry includes power conditioning and management functionality and may include a feature to conserve battery life, which keeps WSN 104 in a standby state and periodically or asynchronously wakes WSN 104 to deliver readings from on-board sensors.

Figure 2:
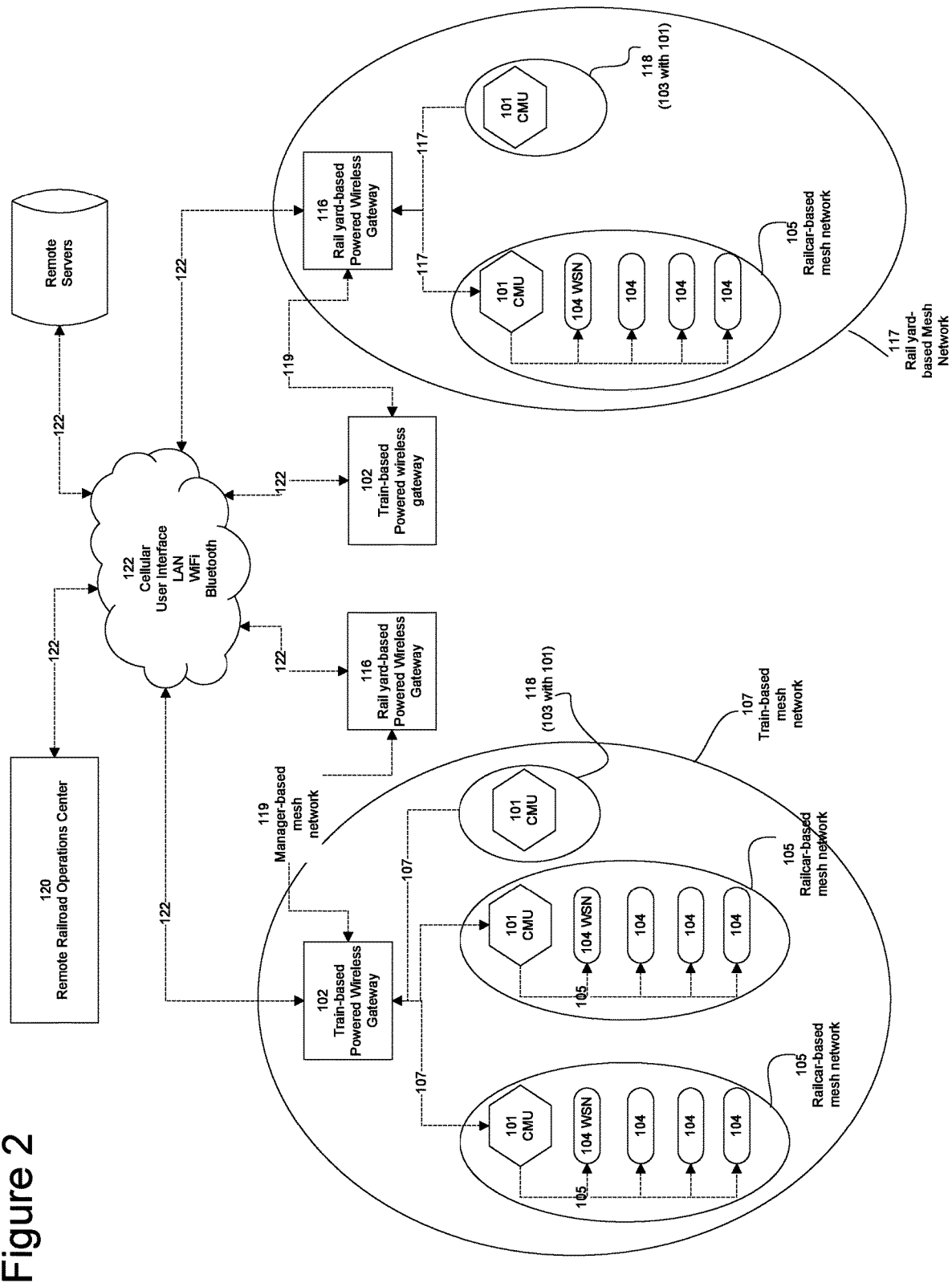
FIG. 2 is a block diagram of the rail yard communication system and a framework of the train-based mesh network with a local area network in accordance with an embodiment of the present invention.

The individual WSNs 104 are mounted on the areas of interest on a railcar 103. As an example, FIGS. 1 and 2 show temperature sensing WSNs 104 of the type described above mounted to a bearing fitting of railcar 103. In this particular example, WSNs 104 may be attached to all wheel bearing fittings of each wheel of railcar 103. In addition, an ambient temperature sensor WSN 104 may also be mounted on a different area of the railcar 103 to receive airflow. On a typical railcar 103, in the case where it is desired to monitor wheel bearing temperature, there will be nine WSNs 104 configured with temperature sensors, one on each bearing fitting (at each wheel); and one sensor placed to measure ambient temperature. The ambient temperature sensor will communicate the ambient temperature to CMU 101, which provides this information to the sensors at the bearing fittings as they call for the information. This will allow the WSNs 104 at the bearing fitting to determine the bearing temperature and then determine if further action is required, such as communicating an alarm of high temperature.

To communicate data collected by each WSN 104, each WSN 104 is in two-way communication with CMU 101 mounted on the railcar 103, which collects data from each WSN 104 and can also send instructions to the WSN 104. As previously discussed, CMU 101 and each WSN 104 connected to the same railcar 103 form a local area ad-hoc railcar-based mesh network 105, to facilitate communications there between. Message packet exchanges are synchronized so that no packets collide on the railcar-based mesh network 105, and every packet is scheduled and synchronized for energy efficiency. Communication traffic on railcar-based mesh network 105 is protected by end-to-end 128 bit (or higher) AES-based encryption, message integrity checking, and device authentication.

CMU 101 is capable of performing advanced data analysis, using data collected from multiple WSN 104 and may apply heuristics to draw conclusions based on the analysis. The chart below contains examples of the types of WSN 104 sensors and high level descriptions of the heuristics applied to analyze the data.

| Parameter Sensed | Sensor Type | Output | Heuristic |
| --- | --- | --- | --- |
| Bearing Fitting Temperature | Temperature Sensor | Bearing Temperature | Bearing fitting temperature is correlated to bearing cup temperature using empirical data. |
| Hatch Position | Reed Switch | Hatch open/close | Determine open/closed state dependent upon state of switch. |
| Pressure | Pressure Transducer | Brake pressure | The pressure transducer is fitted directly to the trainline for measuring pressure. |
| Hand brake Link Strain | Strain Gauge | Hand brake On/Off | Hand brake link strain is correlated to the ON/OFF status of the hand brake. |
| Bolster Displacement | Hall Effect Sensor | Car Load | Bolster/side frame displacement is measured and spring stiffness data is used to convert displacement to load. |
| Bolster position | Reed Switch | Car Empty/Full | The relative position of bolster/side frame is measured. The LOADED position is determined using empirical data or spring stiffness. |
| Inner Jacket Temperature | External Temperature Sensor | Tank Car Commodity Temperature | Inner jacket surface temperature on a tank car is determined and commodity temperature can be estimated using theoretical conduction/convention laws. |
| Bolster Position | Limit Switch | Car Empty/Full | A limit switch is mounted to the side frame and activated when the bolster/side frame position is in the loaded state. |
| Sill Accelerometer | Accelerometer | Coupler Force | Impact data is collected. Using empirical data, a modal influence matrix can be computed for different coupler types that relates the impact data to the output. Using an FFT on the sampled data, and multiplying by the inverse of the modal matrix yields the input in the frequency domain. This input can be converted to the time domain to yield the coupler force. |
| Bearing Fitting Accelerometer | Accelerometer | Bearing Fault Indicator | An fitting mounted accelerometer can be used to sample dynamic bearing data. An FFT can be used on data sets and plotted over time to isolate dominant modes and any shifting or relative amplification. Amplification at rolling frequency indicates a likely fault. |
| Radial Axle Accelerometer | Accelerometer | Vehicle Speed | An axle mounted accelerometer can be used to measure radial acceleration. The radial acceleration can be converted to vehicle speed using simple dynamics using the wheel and axel diameters. |
| Bearing Fitting Accelerometer | Accelerometer | Bearing Fault | A fitting mounted accelerometer can be used to sample dynamic bearing data. Kurtosis can be computed as an indicator of bearing damage. Kurtosis is measured in the time domain and requires computation of a probability density function. |
| Bearing Fitting Acoustics | Piezio-electric sensor, microphone, and accelerometer | Bearing Fault | Sampled acoustic data can be used for either an acoustic noise response or Acoustic Emission which is ring-down counts and amplitude. Empirical data from defective bearings is needed. |
| Temperature | Temperature sensor | Commodity/Fluid Pressure | A temperature sensor can be used to measure surface temperature of a pressure vessel (Tubing, tank, etc.). Heat conduction equations can be used to convert the surface temperature to fluid temperature. Using published data |

-continued

| Parameter Sensed | Sensor Type | Output | Heuristic |
|---|---|---|---|
| Displacement | Displacement Sensor | Coupler Force | for the working fluid, the temperature can be converted to pressure. Coupler displacement is measured and correlated to force using force-closure curves. |
| Axle RPM | Inductive Type Sensor | Vehicle Speed | An inductive proximity sensor facing the axle can generate a signal in response to an exciter ring on the axle, and converted to vehicle speed using wheel and axle diameters. |
| Bearing Fitting Accelerometer | Accelerometer | Track Damage Detection | Sensor is mounted on an fitting or other truck component to sample dynamic data. A Probability Density Function and Kurtosis can be computed from the data. High Kurtosis, or impulsivity, will indicate track defects. A transfer function relating the wheel input to the fitting is needed, and can be determined empirically or by creating a theoretical model. |
| Bearing Fitting Accelerometer | Accelerometer | Truck Hunting Detection | Sensor can be mounted on an fitting or other truck component to sample dynamic data. A simple algorithm could use an FFT to isolate known hunting frequencies. More sophisticated algorithms could detect flange impacts using time-series data. |
| Wheel Temperature | Infra-Red Temperature Sensor | Wheel Tread Temp | Wheel temperature is correlated to tread temperature using empirical data. |
| Proximity | Ultrasonic Sensor | Empty/Full status | An ultrasonic sensor could be used to detect the presence of lading in tank-cars, box-cars, covered hoppers, etc. |
| Strain | Load Cell | Car Load | Load cell on multiple places of the truck. |
| Displacement | Reed Switch | Hand brake On/Off | Position of a hand brake chain is determined and correlated to On/Off Status. |
| Bolster Accelerometer | Accelerometer | Truck tilt angles | Using a 3-axis accelerometer fixed to a bolster, the gravitational field can be used to measure the respective roll, pitch, and yaw angles with respect to fixed-earth coordinates. |
| Hatch Accelerometer | Accelerometer | Hatch Tilt | Accelerometer measures the relative tilt of hatch with fixed-earth coordinates. |

Train-Based Mesh Network

A train-based mesh network is shown generally as reference number 107 in FIG. 1. Train-based mesh network 107 is overlaid on a train consist 109 and is comprised of a PWG 102 installed on a host or control point such as a locomotive 108, or on another asset with access to a power source, and one or more CMUs 101, each belonging to the train-based mesh network 107 and to their respective railcar-based mesh networks 105, if one or more WSNs 104 are present, or respective railcar-based mesh networks 118 for railcars with a CMU 101 but no WSNs. Thus, here, CMUs 101 can belong to two mesh networks, railcar-based mesh network 105 (if railcar 103 is fitted with one or more WSNs 104) and train-based mesh network 107, but is only required to belong to train-based mesh network 107. Each CMU 101 is also optionally managing its respective railcar-based mesh network 105. The railcar-based mesh network 105 is continually monitored by the CMU 101 and is optimized for the ever changing wireless environment that a moving railcar 103 experiences. Train-based mesh network 107 uses an overlay mesh network to support low-power bi-directional communication throughout train consist 109 and with PWG 102 installed on locomotive 108. The overlaid train-based mesh network 107 is composed of wireless transceivers embedded in the CMU 101 on each railcar 103. Each CMU 101 is capable of initiating a message on the train-based mesh network 107 or relaying a message from or to another CMU 101. The overlay train-based mesh network 107 is created independently of, and operates independently of the railcar-based mesh networks 105 created by each railcar 103 in the train consist 109.

A bi-directional PWG 102 manages the train-based mesh network 107 and communicates alerts from the CMUs 101 installed on individual railcars 103 to the host or control point, such as the locomotive 108, wherein the alerts may be acted upon via human intervention, or an automated system. Locomotive 108 may include a user interface for receiving and displaying alert messages generated train-based mesh network 107 or any of the individual railcar-based mesh networks 105. Bi-directional PWG 102 is capable of receiving multiple alerts, events or raw data from WSNs 104 through CMUs 101 on individual railcars 103 and can draw inferences about specific aspects of the performance of train consist 109.

Bi-directional PWG 102 is capable of exchanging information with an external remote railroad operations center 120, data system or other train management system. This communication path is shown in FIG. 2 as reference number 122, and can include cellular, LAN, Wi-Fi, Bluetooth, satellite, or other means of communications. This link can be used to send alerts off-train when the train consist 109 is in operation, or, when in a rail yard 114, can be used for train management functions, such as specifying the railcars 103 that should be in train consist 109, allowing only those railcars 103 to join the train consist 109 and reporting any railcars 103 that are absent from the train consist 109 or railcars 103 that are in an incorrect train consist 109 (i.e., train consist 109 validation). If a rail yard based mesh network 117 is not present in a rail yard 114, the train based mesh network 107 remains in its current state without change, unless one of the following occurs: user interface on locomotive 108 removes cars from train consist 109, railcars 103 are relocated out of range of train consist 109, or through communication with the remote railroad operations center 120 or remote servers via communication paths 122.

Rail Yard-Based Mesh Network

Figure 3:
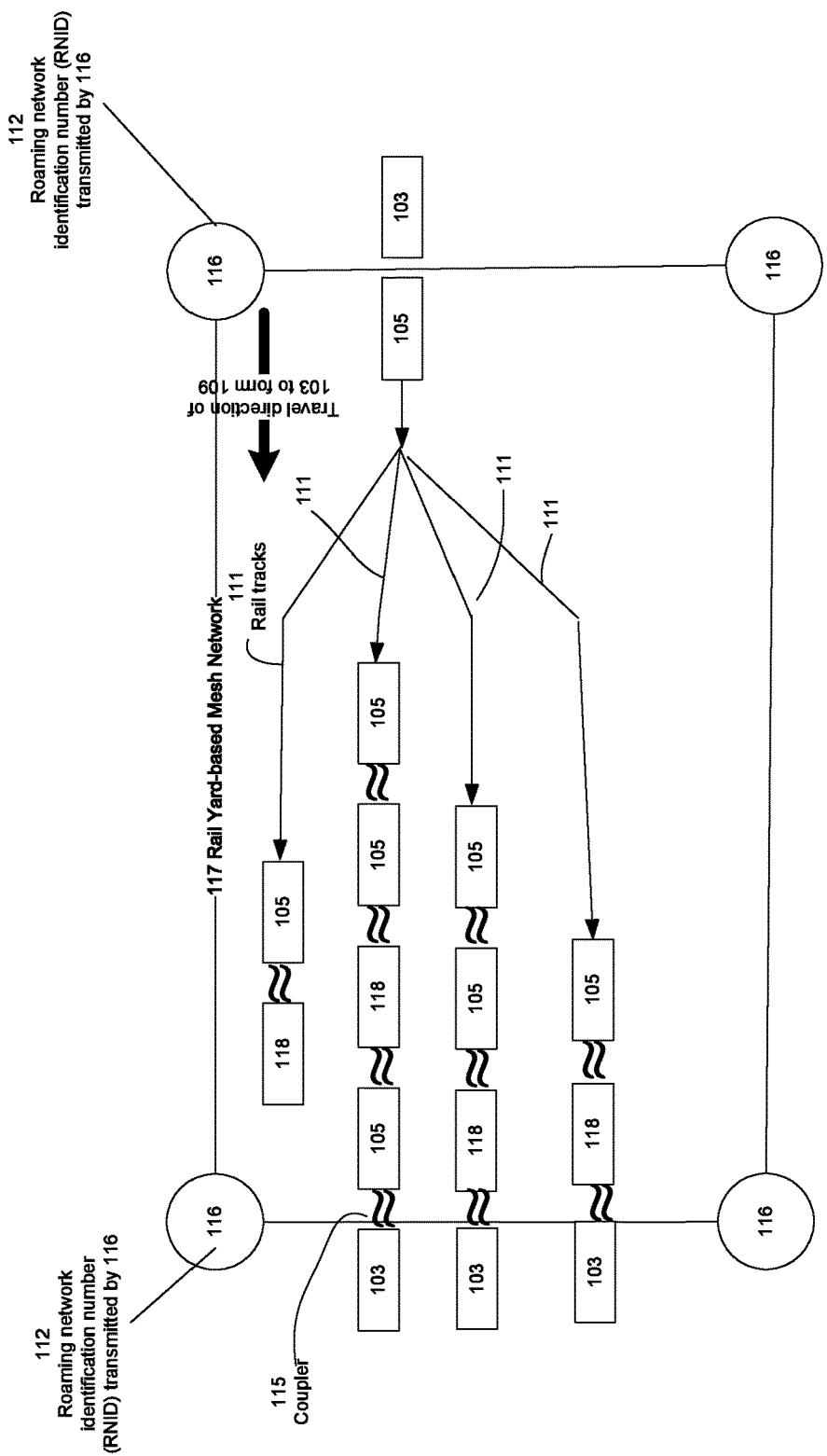
FIG. 3 is a block diagram of a train consist association.

In another embodiment of the invention, and with further reference to FIG. 3, PWGs 116 and CMUs 101 can be part of a rail yard-based mesh network 117. Land-based PWGs 116 are deployed at various locations in a rail yard 114 to provide coverage regardless of location within the rail yard 114. The rail yard PWGs 116 are used to organize the railcar-based mesh network 105 or 118 of devices on the host or asset with access to a power source, as well as railcars 103 within range of a PWG 116 not associated with a train consist 109. This process is discussed in more detail below. Thus the rail yard-based mesh network 117 will consist of nodes including land-based PWGs 116, locomotive-based PWGs 102, when the locomotive 108 is unassociated with a train consist 109, and CMUs 101, when their respective railcars 103 are not associated with a train consist 109. If a railcar 103 equipped with CMU 101 is not associated to a TNID 113, it is associated to a RNID 112. Locomotives 108 equipped with a PWG 102 can sense the rail yard-based mesh network 117, but are not actually members of that network.

An application programming interface ("API") or user interface issues commands to the rail yard PWGs 116 via remote railroad operations center 120 and communications pathway 122 to PWGs 116 that will wirelessly communicate with the railcars 103 on which CMUs 101 are installed, to form the appropriate train-based mesh networks 107 as train consists 109 are assembled. The API or user interface commands also are issued to PWG 102 on locomotive 108, enabling the train-based mesh network 107 to be formed to match the train consist 109.

In FIG. 2, a WiFi network or wide area network as shown by reference number 122 is capable of transmitting to a CMU 101 on each railcar 103 when railcar 103 is in a rail yard 114 and logically not attached to a train consist 109 (although the railcar 103 may be physically attached).

Rail Yard Management System

The infrastructure described above can be used in the context of a rail yard 114 to manage the assembly and disassembly of train consists 109. Preferably, railcars 103 will each be equipped with one CMU 101 and one or more WSNs 104 having an accelerometer for sensing orientation, and an accelerometer for sensing motion or impact. Alternatively, the CMU 101 on the railcar 103 may be equipped with an internal accelerometer and/or magnetometer.

The rail yard management system uses four network states. The first network state is "in-network," which means one or more railcars 103 equipped with CMUs 101 and one or more locomotives 108 equipped with PWGs 102, are connected to a train-based mesh network 107, identified by a TNID 113.

The second network state is "out of network", which means one or more railcars 103 equipped with CMUs 101 and/or one or more locomotives 108 equipped with a PWG 102 are not connected to a train-based mesh network 107, but rather are connected to the rail yard-based mesh network 117, identified by a RNID 112 transmitted by PWGs 116 installed in a rail yard 114.

A third network state is "dark," which means one or more railcars 103 equipped with CMUs 101 are not connected to a train-based mesh network 107 or to a rail yard-based mesh network 117, which can occur when a CMU 101 is out of range from a PWG 102 or 116.

A fourth network state is "unmonitored," which means one or more railcars 103 not equipped with CMUs 101 cannot connect to a rail-yard based mesh network 117, train-based mesh network 107 or a railcar-based mesh network 105 until the railcar 103 is equipped with a CMU 101. "Unmonitored" may also refer to a rail yard 114 that is not equipped with a PWG 116 and thus has no rail yard based mesh network 117. In this case of an "unmonitored" rail yard, Rail Yard Management is not possible, however a train based mesh network 107 can form through any of the following means: user interface on locomotive 108 adds railcars 103 to train consist 109, railcars 103 are relocated within range of train based mesh network 107, or through communication with the remote railroad operations center 120 or remote servers via communication paths 122.

There are four ways a CMU 101 installed on a railcar 103 can be commanded to change from the TNID 113 to the RNID 112:

The first and primary method is via the PWG 102, installed on the host 108, that is managing the train based mesh network 107 to which the CMU 101 is connected. The PWG 102 can command one or more CMUs 101 to change to the rail yard-based mesh network, using RNID 112, from its train-based mesh network 107 with unique TNID 113. This action can be commanded by the PWG 102 when it recognizes the presence of a rail yard-based mesh network 117 on entry to a rail yard 114, or when sent via another communication path 122 from the remote railroad operations center 120 or remote servers.

The second method is via a PWG 116 installed in rail yard 114. The PWG 116 can transmit an event message commanding one or more CMUs 101, that are connected to its rail yard-based mesh network 117 using RNID 112 to change to a unique TNID 113.

The third method is for a CMU 101 that is not part of a train-based mesh network 107 or a rail yard-based mesh network 117, also known as a "dark railcar", to recognize the presence of either network and command itself to connect to the detected network with a RNID 112 or TNID 113.

The fourth and last option is via a user interface 122 used by a railroad operator or yard manager at remote railroad operations center 120. The railroad operator, through a user interface, can transmit an event message to the CMU 101 installed on a railcar 103 directing it to change to a train-based mesh network 107 having a unique TNID 113, or to change to the rail yard-based mesh network 117 using a RNID 112. This message may be transmitted via cellular or other communication via path 122 in FIG. 2.

Train Consist Formation

FIG. 3 shows the process by which a railcar 103 is logically associated with a train-based mesh network 107. A railcar 103 with CMU 101 is physically added to a train consist 109 via a railroad hump rail yard 114 or railroad flat switching rail yard 114, however, the railcar 103 is still logically part of the rail yard-based mesh network 117, having a RNID 112, as shown in FIG. 3.

Figure 4:
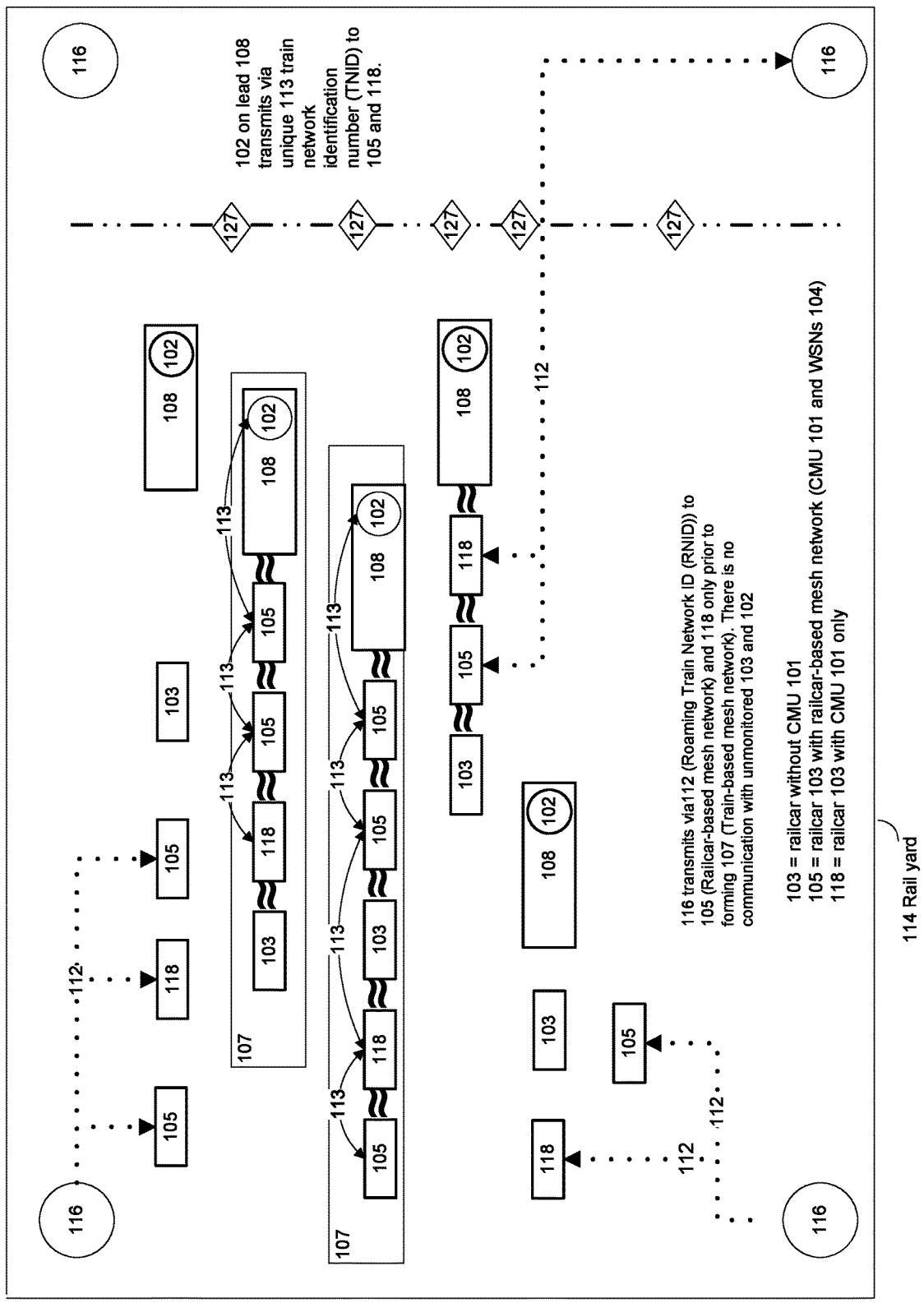
FIG. 4 is a block diagram of the setting up of a train-based mesh network.

The railroad then determines which locomotive 108 is to be coupled with train consist 109. When a locomotive 108, having a PWG 102 is assigned to the group of railcars 103 that are now physically connected, as shown in FIG. 4, PWG 102 receives a message from remote railroad operations center 120 to form train-based mesh network 107. At this point, locomotive 108 forms the train-based mesh network using that unique TNID 113. Locomotive 108 is, at this point, part of the train-based mesh-network 107, using the TNID 113, but is still able to sense the yard based mesh network 117 via the RNID 112.

One mechanism of determining consist creation is listed as follows. PWG 102 installed on the selected locomotive 108 may contain an accelerometer that measures the impact experienced by locomotive 108 when it physically connects to train consist 109. When locomotive 108 is physically connected to train consist 109, the accelerometer will measure impacts. If the impacts exceed a pre-define threshold, PWG 102 will transmit an event message stating that locomotive 108 is connected to train consist 109. Understanding which railcars are part of the train consist is logistically important, and may be derived by the coupling of locomotive 108 with train consist 109. For example, if a railcar 103 loaded with a chemical considered to be a toxic-inhalation hazard (TIH) is in the wrong train consist 109, the train consist 109 must be stopped, and the TIH railcar 103 removed from the train consist 109.

The CMU 101 on each railcar 103 assigned to the train consist 109 will also receive a message, via the rail yard-based mesh network 117, a rail yard 114 WiFi or a rail yard 114 wide area network 122, to look for a particular TNID 113, which will be the TNID 113 associated with the train-based mesh network 107 controlled by PWG 102 on the assigned locomotive 108, as shown in FIG. 4. At this point the CMU 101 on each railcar will change from the rail yard-based mesh network 117 and search for the train-based mesh network 107 broadcasting the correct TNID 113. PWG 102 receives a message transmission from each railcar's CMU 101, which train-based mesh network 107 uses to associate each railcar 103 to the train consist 109. When the locomotive 108, having a PWG 102 which is transmitting the TNID 113 that railcar 103 is searching for, is discovered by railcar 103, railcar 103 becomes associated with the train-based mesh network 107, using TNID 113.

Train Consist Disassembly

When a railcar 103 with a CMU 101 enters rail yard 114 as part of a train consist 109, the CMU 101, and the PWG 102 installed on the locomotive 108 are in bi-directional communication on a train-based mesh network 107 having a particular TNID 113.

Rail yard 114 is equipped with one or more land-based PWGs 116, which are installed at fixed locations throughout rail yard 114. The land-based PWGs 116 form a rail yard-based mesh network 117. The rail yard-based mesh network 117 continually broadcasts an assigned or designated RNID 112.

The PWG 102 installed on locomotive 108 receives a message from the user interface, via a rail yard-based Wi-Fi or wide area network 122, or over the manager-based mesh network 119, shown in FIG. 2, telling PWG 102 to transmit a message to the CMU 101 on each railcar 103 assigned to the TNID 113 it is broadcasting. The message tells the CMU 101 in each railcar 103 to change from TNID 113 to the RNID 112 transmitted by the rail yard-based mesh network 117. At this point, the railcars 103 and locomotive 108 may still be physically connected.

As part of the railroad classification process, railcars 103 are then physically un-coupled from train consist 109 and sorted into one or more new train consists 109. The rail yard-based mesh network 117 is capable of validating that train consist 109 has been disassembled by one or more of the following methods, Location, speed, heading, motion, RSSI, and current network status, as reported by the PWG 102 installed on the locomotive 108 in the train consist 109, or the CMU 101 installed on the railcar 103 in the train consist 109.

Train Consist Validation

Figure 5:
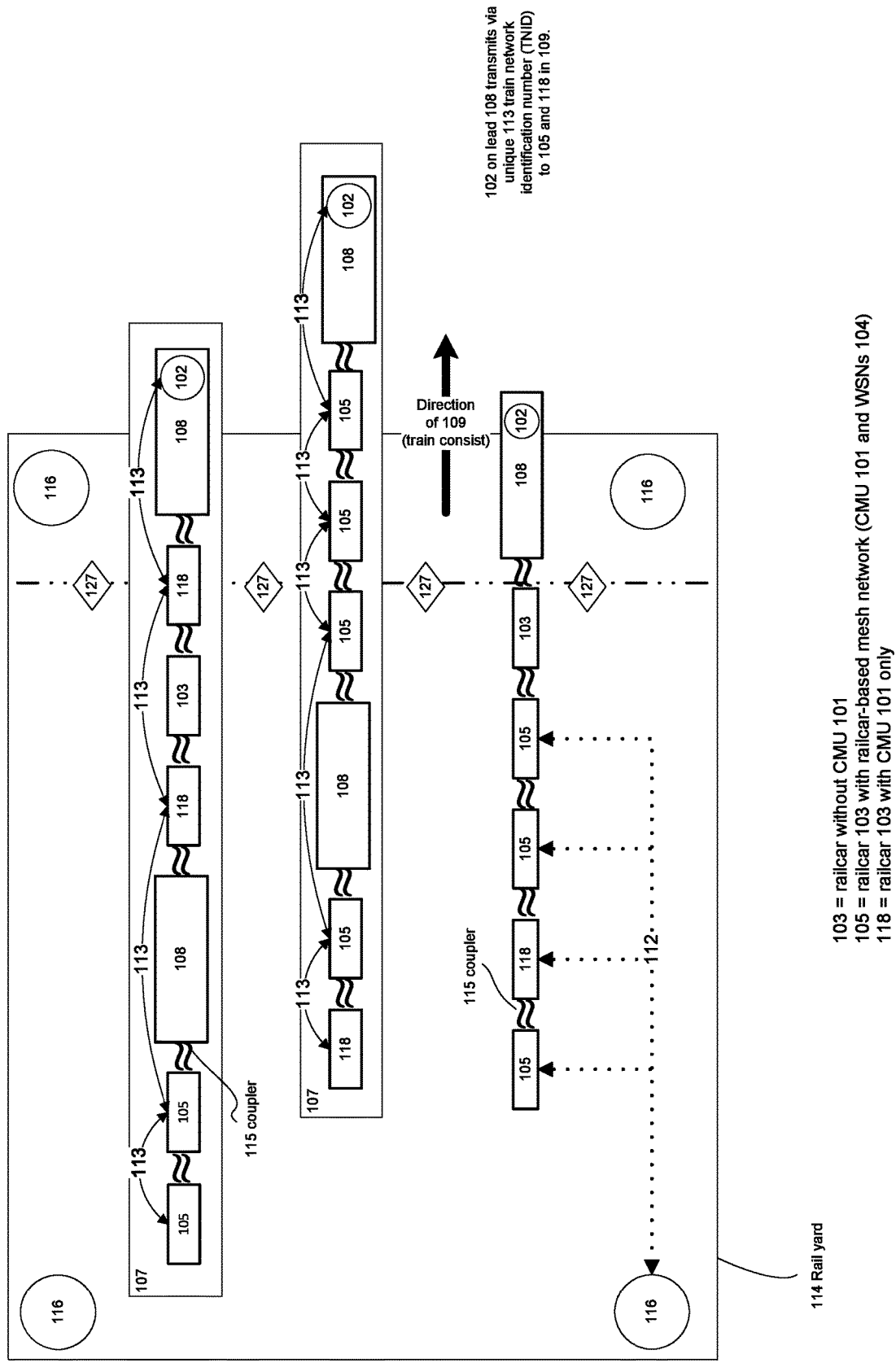
FIG. 5 is a block diagram of a train consist validation.

With further reference to FIGS. 4 and 5, railroad-based rail yard 114 systems know the specific railcars 103 that need to be moved to other locations to form a new train consist 109. The train-based mesh network 107 is able to collect information and validate the railcars 103 coupled together to form the train consist 109.

There is a possibility that a CMU 101 on a railcar 103 in the train consist 109 did not receive a transmission telling the CMU 101 to disassociate from the RNID 112 being transmitted by the PWG 116 installed in rail yard 114 and then re-associate with the TNID 113 being transmitted by the PWG 102 installed on the lead locomotive 108.

To validate train consist 109, the system has to confirm the railcars 103 in train consist 109, the order of the railcars 103 in the train consist 109 and the orientation (i.e. is the "A" or "B" end of the car facing the head end of the train consist 109) of the railcars 103 in train consist 109.

Train consist 109 validation is accomplished by combining the GPS location, speed, and heading readings, determined by the GPS sensor in each railcar-based mesh network 105, such as that in each CMU 101 installed on each railcar 103, plus one or more of the following methods:

1) creating dynamic geofences, where a geofence is a physical area of arbitrary shape defined by a set of GPS coordinates;

2) monitoring simultaneous impacts from an accelerometer installed in the CMU 101 on "hammer" railcar 103 and "anvil" railcar 103;

3) Relative Signal Strength Indicator (RSSI) between devices on separate railcars;

4) a motion sensor installed in the CMU 101 to detect motion or lack thereof;

5) an automatic equipment identification (AEI) tag reader 127 or an active RFID tag where a CMU 101 equipped with an RFID reader sensor that acknowledges the acquisition of an active RFID signal;

6) a CMU 101 installed on a railcar 103 actively senses or "sniffs" for a connectivity source broadcasting a TNID 113;

7) a WSN 104 equipped with a local or proximity sensor;

8) a CMU 101 installed on a railcar 103 recognizes one or multiple train-based mesh networks 107 in its vicinity; or 9) a WSN 104 installed on the railcar 103 brake pressure lines to monitor the pressure release then transmits a message to the CMU 101 installed on the railcar 103.

For example, the system can use the existing Automatic Equipment Identification (AEI) tag readers 127, which uses RFID to read the information on the AEI tag installed on the railcar 103. The AEI tag readers 127 exist at rail yard 114 exit points and have a fixed placement in rail yard 114. The AEI tag readers 127 use an excitation frequency in the 902 to 915 MHz range. In normal railroad operations the excitation signal is only used to energize the AEI tag installed on the railcar 103 and provide energy to backscatter the signal, which contains the tag identifier and any other information programmed into the AEI tag. The CMU 101 contains a radio frequency ("RF") sensor tuned to the 901 to 915 MHz band. As the train consist 109 exits rail yard 114, it passes an active AEI tag reader 127. The radio frequency sensor in the CMU 101 recognizes the excitation signal from AEI tag reader 127. The CMU 101 processes the location it received the AEI tag reader signal and then creates an event message. The event message is transmitted from CMU 101, through the train-based mesh network 107 to the PWG 102 installed on the lead locomotive 108 in train consist 109. The train-based mesh network 107 analyzes the timing of the event messages which are received from each CMU 101 installed on a railcar 103 as it passed an active AEI tag reader 127. From this, the train-based mesh network 107 can deduce the order and the orientation of the railcars 103 in train consist 109. This can be determined, as the CMU 101 will preferably be installed on a known end (e.g. the "B" end) of the railcar 103.

The CMU 101 on each railcar 103 is transmitting to the PWG 102 on the host (e.g., a locomotive 108), which is transmitting the RNID 112 and the TNID 113. The approximate physical location of the railcar 103 may be known through a 2D network location or using a GPS system installed on railcar 103.

There can be a positioning error when only using 2D or 3D networks to determine railcar 103 location, resulting in a railcar 103 being identified on a wrong track. To overcome this error, a secondary method to validate railcar 103 location may be done through physical connection. Physical connection is validated by monitoring accelerations indicative of railcar 103 coupling, using the WSNs 104 or CMUs 101 on adjacent railcars 103 being coupled. These accelerations are synchronized with a time stamp, which gives the network time, date and GPS-based location. Network time is accurate to a millisecond.

The CMU 101 will analyze accelerations it receives from its accelerometer. When acceleration indicative of a railcar 103 coupling is determined, an alert will be transmitted from the CMU 101 to the PWG 116 installed in rail yard 114 via RNID 112 or if the railcars 103 and locomotive 108 have been assigned to a TNID 113, an alert also can be transmitted through the train-based mesh network 107 with TNID 113. An alert is triggered when accelerations exceed a predetermined threshold value, which is time stamped with date, time and location. The alert is transmitted to the PWG 116 installed in rail yard 114, to the PWG 102 installed on the locomotive 108 and directly from the CMU 101. The source of an acceleration event can be determined when the "hammer" railcar 103 (i.e., the moving railcar 103) impacts the "anvil" railcar 103 (i.e., the stationary railcar 103). As one skilled in the art will know, the hammer railcar 103 is the railcar 103 that strikes another railcar 103, which is known as the anvil railcar 103 to complete a coupling process. The accelerations transmitted by the CMUs 101 on each railcar 103 are analyzed such it can be inferred the hammer and anvil railcars 103 successfully coupled.

Subsequent coupling actions can be used to confirm the association between railcars 103 and the position of each railcar 103 in train consist 109. For example by analyzing the speed of sound in steel, which is roughly 6000 m/s and 1 ms resolution, it can be expected that a 3 ms difference can occur from one end of a 20 m long railcar 103 to another railcar 103. The physical position of a railcar 103 in a train consist 109 can be further validated by using network location or onboard GPS.

The train consist 109 can be validated when each railcar 103 passes a location where an Automatic Equipment Identification ("AEI") reader 127 is installed. When a railcar 103 equipped with an AEI passive RFID device passes AEI reader 127 a message is created that can be related to other railcars 103 or the locomotive 108 passing the same AEI reader 127.

A train consist 109 where each railcar 103 is equipped with a CMU 101 and where the lead locomotive 108 is equipped with a PWG 102 that transmits a TNID 113 to each CMU 101 in the train consist 109 can be further validated upon leaving rail yard 114. Each CMU 101 in train consist 109 recognizes TNID 113 transmitted by the PWG 102 installed on locomotive 108 and, as previously discussed, together form a train-based mesh network 107. Each CMU 101 and the PWG 102 can transmit bi-directionally within train-based mesh network 107.

The system also can validate train consist 109 by comparing each railcar 103 CMU 101 connected to TNID 113 against a list of each railcar 103 and the respective railcar 103 CMUs 101 assigned and transmitted by the user-interface or remote railroad operations center 120.

The system also can validate train consist 109 using an end-of-train device paired with the PWG 102 installed on the lead locomotive 108.

The system also can validate the train consist 109 based upon the length of the train consist 109, the railcar 103 identification marks transmitted and the railcar 103 length transmitted.

If a railcar 103 is in train consist 109 but not associated to the TNID 113 being broadcast by the PWG 102 installed on the lead locomotive 108, then a PWG 116 installed in rail yard 114 transmits an event message telling the CMU 101 in the errant railcar 103 to change from the RNID 112 to the known TNID 113 of the train consist 109 to which it is connected. In the instance where the TNID 113 of a train consist 109 is unknown, the PWG 116 will listen for surrounding network advertisements which contain the TNID 113 of the train consist 109, or the PWG 116 transmits an event message commanding the CMU 101 in the errant railcar 103 to listen for surrounding network advertisements containing the TNID 113 of said train consist 109. Upon learning the TNID 113 of the train consist 109 to which the errant CMU 101 is connected, the CMU 101 will automatically change itself to the TNID 113 of the train consist 109. After the CMU 101 changes to the TNID 113 of the train consist 109, the pairing of the errant CMU 101 to the train consist 109 with TNID 113 must be validated as the correct TNID 113, by one or more of the preceding methods discussed in train consist 109 validation. An alert may be generated to inform the operators that an errant railcar 103 is in the train consist 109.

Dark Railcars

The CMU 101 on a dark railcar 103 operates in a reduced configurable duty or power cycle wherein it is listening long enough to pick up a transmission from a PWG 102 installed on a locomotive 108 as the locomotive 108 passes the dark railcar 103. The dark railcar 103 can be in an area such as rail yard 114 or on a railroad side track or siding. The locomotive PWG 102 has a power source, thus it can be in a continual promiscuous listen mode (meaning it will attempt to join any network) searching for dark railcars 103 with which to connect (i.e., "sniffing").

When a locomotive 108 equipped with a PWG 102 passes by a dark railcar 103 and the CMU 101 on the dark railcar 103 announces its presence to PWG 102 on the locomotive 108, the PWG 102 will log the current location of the dark railcar 103 and upload that information to the remote railroad operations center 120 at a later time.

The CMU 101 on the dark railcar 103 has three listen modes. 1) The CMU 101 listens for a percentage of time or certain duty cycle to join a TNID 113; 2) The CMU 101 listens for a percentage of time to join a RNID 112; and 3) The CMU 101 listens for a percentage of time to join any network.

The system of the current invention assumes that each railcar 103 in a train consist 109 is equipped with a CMU 101 and that each locomotive 108 is equipped with a PWG 102, however, the system does consider the possibility that not all railcars 103 will be equipped with a CMU 101. In such cases, all computations regarding validation of train consist 109 are adjusted to take into account the fact that enabled railcars 103 may not be adjacent to each other, but may be separated by one or more non-enabled railcars 103.

Yard Management and Monitoring

Figure 6:
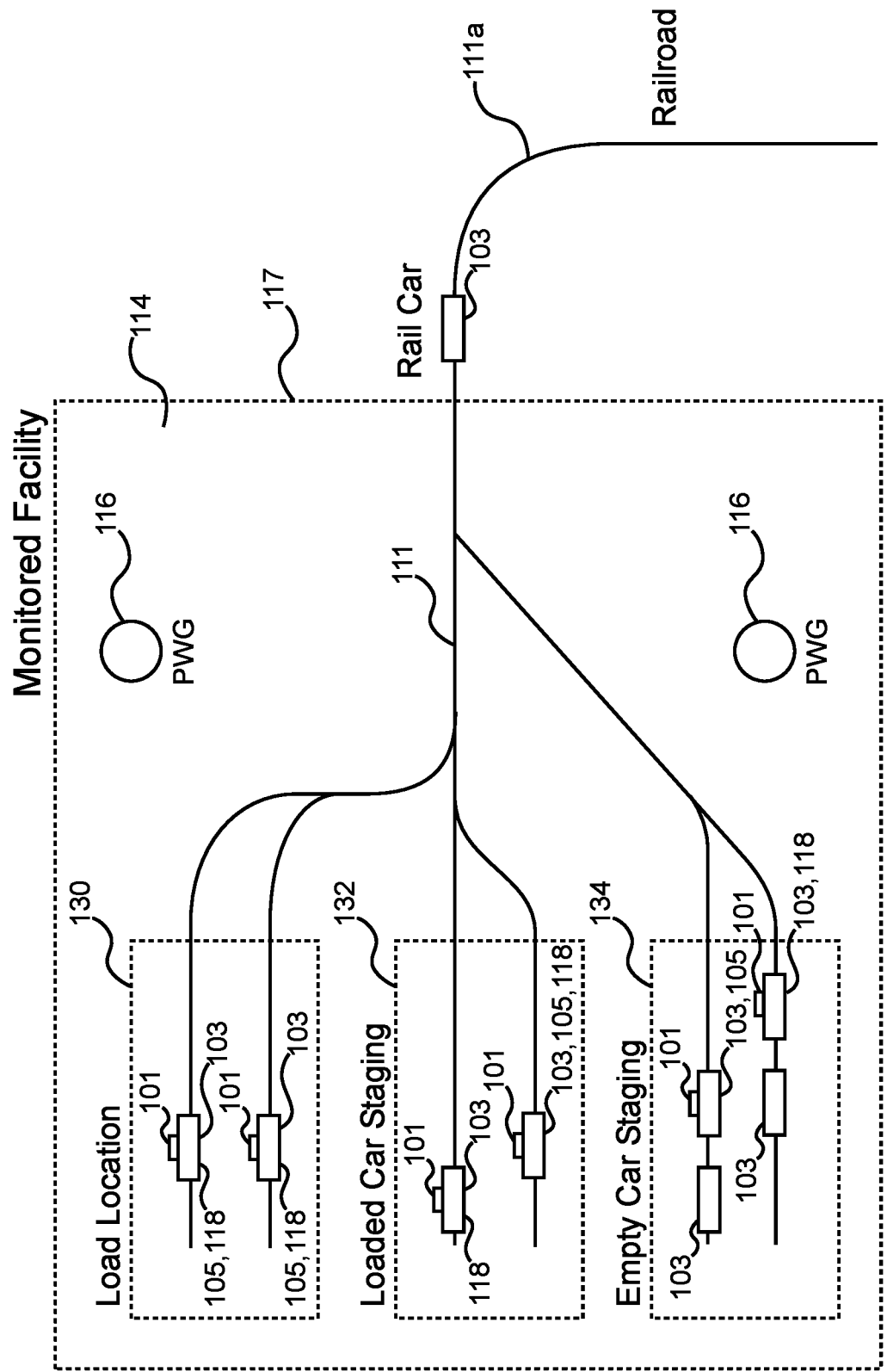
FIG. 6, is a schematic diagram of a monitored rail yard which has a rail yard communication system for communicating with the railcars therein in accordance with the present invention, for example, a facility where railcars are loaded, unloaded, stored and/or maintained.

The infrastructure described above can be used for other yard management and monitoring applications as well. The bidirectional communications between railcar assets 103 with a CMU 101 (e.g. railcars with a railcar based network 105 and monitored railcars 118), and PWGs 116 of a rail yard are particularly advantageous at a facility where rail assets are stored, loaded, emptied and maintained, such as that of a large chemical facility. An example of such a facility is now described with further reference to FIG. 6 illustrating a chemical facility yard 114 having a railcar load location 130, a loaded car staging area 132, an empty car storage area 134, rail tracks 111 connecting the various locations within the yard and tracks 111a outside the yard on which the railcars 103 are delivered to and exit from the yard.

Here, land based PWGs 116 of the yard 114 and CMUs 101 located on the railcars 103 form part of the rail yard-based network 117. There is no need for a train-based-network in this case, as the data is passed between the PWG's 116 and the CMU 101s of the rail cars 103. Preferably, a suitable number of PWGs 116 are located throughout the yard 114 to ensure coverage for all desired areas in the yard, even for a single railcar 103 in the entire yard.

A train consist 109 enters the rail yard 114 and releases railcars 103 designated for that yard. The CMUs 101 of the cars 103 dropped off can change to the RNID 112 assigned to the local rail yard-based network 117 as described above. The railcars 103 with CMUs 101 that are expected can be allowed to join the RNID 112 of the rail yard based network 117. Those that are not expected may be denied access to the network 117, be allowed to join the network 117, be the subject of query as to the status of the car 103 and/or be the subject of a message transmitted that the car was dropped off at the wrong yard. Such railcars may be reconfigured, pushed out of the network, and can join a train consist 109 for leaving the yard as described above.

Utilizing the array of built-in sensors, WSNs, and spatial capabilities as described above, the invention allows for numerous applications. One application is yard logistics, i.e., monitoring and managing the location of the railcar assets 103. Yard congestion is a major problem for railroads and shippers alike. Real time disposition of all railcar assets 103 with monitoring capabilities (e.g., railcars with a railcar based network 105, monitored railcars 118) in the yard 114 can be determined and the information fed into yard management applications. For example, railcar locations, such as at the loading area 130 and staging area 132 can be confirmed, and motion events and dwell times of the railcars can be determined for making yard forecast and optimization models.

Another application is yard safety and security. The railcars 103 can be monitored for over-speed impacts, railcar handbrake status, door or hatch openings, gas leaks, etc. Such applications can be used to ensure/audit compliance with operating procedures.

Load management is another application. The yard-based network 117 can connect a railcar onboard weighing system (and/or level measurement) to a shipper's plant monitoring and control applications (e.g., SCADA). This may also include temperature data where steamers are used to unload product.

Another application is commodity monitoring. Temperature, pressure, humidity, weight, liquid levels, etc. can be monitored—anything the shipper needs to monitor while the commodity is stored within the yard 114.

Specific examples and advantages of various applications capable with railcars 103 having at least a CMU 101 (e.g., railcars with a railcar based network 105, monitored railcars 118) include the following:

Utilizing the array of sensors and bidirectional communications as described above, the facility rail operator/planner would be able to stage loaded railcar assets 103 for immediate shipment, organize maintenance events, rapidly identify delivered assets, etc.

Since the yard-based network 117 can continuously manages power usage and is time synchronized, communications between railcars 103 and the PWGs 116 can have minimal latency compared to other systems (e.g., 0-10 seconds, typically within 1-3 seconds), and the entire fleet of assets could be diagnosed quickly; either for asset status/health, or commodity condition.

All railcar assets 103 in the load location 130, or in loaded car staging area 132, can have their commodity temperature/pressure monitored real time, on demand, or in regular time intervals such as every 15 minutes to ensure that the product is at a safe temperature/pressure. On demand or regular data sweeps for any information that can be ascertained from the sensors, WSNs and CMUs can be requested, e.g., hand brake status, asset location, temperatures, pressures, hatch and door positions, etc.

The number of railcars 103 within the empty car storage area 134 can be checked dynamically to appropriate railcar assets 103 for a newly quoted shipment.

New railcars 103 that enter the yard 114, and therefore become present on the facilities' PWG, can be marked accordingly within the ERP system as delivered. Similar for assets that leave the facility, they will be marked as gone.

Hatch open/close data can be used to identify precise load and unload times for each commodity and railcar type.

The event of a railcar asset 103 entering the load location 130 could trigger the CMU 101 on the railcar to initiate a state change, e.g. starting onboard weight monitoring.

Railcar onboard weighing systems can transmit weight of the loaded commodity to the facility's asset and load management system.

Metrics can be automatically assigned to each car 103, in terms of time spent in storage, maintenance, loading, staging, etc.

An email or other forms of communication can be sent once a car is fully loaded.

It is appreciated that the specific application or monitoring task involving a particular rail car 103 requires the appropriate sensors or WSNs 104 on the railcar. For example, monitoring the temperature of the cargo requires a temperature sensor, such as a WSN 104 with temperature sensing capabilities disposed to monitor the cargo temperature.

Data Processing Platform

The data processing platform is responsible for implementing the intelligence used to draw conclusions based on the data collected from WSNs 104, CMUs 101 and PWGs 102. Preferably, the data processing platform is distributed among all WSNs 104, CMUs 101, PWGs 102 on a locomotive and PWGs 116 installed in a rail yard, as well as utilizing a cloud-based infrastructure optimized to work closely with train-based mesh networks 107 and rail yard-based mesh networks 117, in conjunction with a variety of data streams from third-party providers or external sources.

The data processing platform preferably has an extensible architecture using a distributed complex event processing (DCEP) engine, which can be scaled to support millions of individual pieces of train-based systems across a global network. DCEP distributes decision-making to the lowest possible level to avoid the excessive power consumption and bandwidth utilization that would otherwise be required to move large amounts of data from train-based hardware to a cloud-based data processing system.

When DCEP is used in conjunction with a CMU 101 or WSN 104 that has DCEP embedded software deployed, the platform has the capacity to filter and execute millions of events per second in real time.

Specific software to detect an event in real time, based on collected data readings is embedded in each CMU 101 and/or WSN 104.

The DCEP engine aggregates data streams, such as events and metadata, through data stream adapters from varied sources to include customer data, environmental data, as well as data from a CMU 101 and a WSN 104. The DCEP comprises data stream adapters, a temporal analysis module, a spatial analysis module, a rules engine and a publisher module.

A temporal analysis module processes data to determine changes in values over time. For example, a WSN 104 is measuring the temperature of bearing. Said module will determine the change in temperature readings over a time period allowing further analysis to be done such as trending.

A spatial analysis module processes data to determine the relative position of an object, in this invention, a railcar 103. The position of a railcar can be compared to a geofence to determine if it is inside or outside of the geofence, and can then be compared to a route map to determine if an asset is out of route or off course or similar types of applications. Further, analysis can be performed on a locomotive PWG 102 or yard PWG 116 covering spatial aspects across many railcars.

A rules engine is an application module where detailed operating parameters are stored such that when data from the temporal and spatial modules is sent to said module it will compare the data to the detailed operating parameters. Based on this comparison, only the data determined to be critical is transmitted to a publisher (where the information is destined for another system or user). The rules engine drives filters and logic to the source, which could be a CMU 101, WSN 104, or PWG 102, where it reviews many data points, coalescing the data into practical events such as alerts, reports and dashboards.

The publisher is an application module that takes the critical data from the rules builder module to create easily understood alerts, reports, and information dashboards for the end user or system.

Data is processed through the temporal and spatial analysis modules followed by a set of rules engine filters which determine critical from non-critical information based on the specific rule-set defined. Information further is pushed to either the publisher module or to a third-party integration platform where operational decisions, enterprise resource planning (ERP) transactions, dashboards, and alerts can be actioned.

For example, a CMU 101 is installed on a railcar 103 along with a WSN 104 on the bearing fitting of each wheel to measure bearing temperature. The CMU 101 sends temperature data measured by each bearing WSN 104 to an integration endpoint system (i.e. a cloud based or on-premise server). This data also can be referred to as a data stream from an asset or fleet. At the same time, a data stream from a source providing railcar 103 waybill data is collected by the integration endpoint system where it is aggregated with the asset data stream then processed through specific rules and event filters. The data generated after processing by the filters can be converted into an informational message and as the same time pushed to an end user ERP system. The ERP system further may process data and push results to sources such as a maintenance department of a railroad for further action.

In another example, one or more PWGs 116 are installed in a rail yard 114. The PWGs 102 collect data from railcars 103 equipped with a CMU 101 and one or more WSNs 104, as described above.

The API is designed to provide methods to manage railcars 103, locomotives 108 and train consists 109 within, or outside, a rail yard 114 where railcars 103 and locomotives 108 are managed by a railroad or other entity personnel.

The API methods are exposed as web services using the secure HTTP protocol over SSL, or directly on a system through an application library. The commands and functionality can be accessed on a PWG installed on a locomotive 108 through a wired network connection or from the rail yard 114 wirelessly. The same API and functionality is present on the rail yard PWG 116 in order to make the system more flexible. This flexibility is required so the rail yard PWG 116 and the PWG 102 installed on the locomotives 108 can be managed from one central location such as a remote railroad operations center 120 if necessary.

It is appreciated that described above are novel systems, devices and methods. It is also understood that the invention is not limited to the embodiments and illustrations described above, and includes the full scope provided by the claims appended hereto. It is further appreciated that the systems, devices and methods described above also are applicable to other vehicle yards such as yards for trucks and trailers.

We claim:

1. A rail yard management system for managing one or more railcars within a rail yard, comprising:
   one or more railcars, wherein each railcar has a railcar based mesh network overlaid thereon;
   a rail yard-based mesh network having one or more land-based wireless gateways that are installed at fixed locations in said rail yard; and
   said rail yard management system configured to perform the following functions:
   (a) allowing one or more communication management units associated with each of said one or more railcars to become nodes in said rail yard-based mesh network when said railcars are within said rail yard;
   (b) collecting data from said one or more communication management units through said rail yard-based mesh network; and (c) determining the state of various operational parameters of said railcars from said collected data;
wherein the various operational parameters comprise both forces experienced by said railcar during coupling and a weight of commodities loaded on said railcar.

2. The rail yard management system of claim 1 wherein said communication management units associated with each of said railcars collect data from one or more sensors on their respective railcars and relay said data to said system, each of said sensors being positioned on its respective rail car to collect data regarding at least one of said operational parameters.

3. The rail yard management system of claim 2 further comprising a data processing platform able to draw conclusions regarding the state of said railcars based on said collected data.

4. The rail yard management system of claim 3 wherein said data processing platform includes a distributed event engine which distributes decision-making based on said data to the lowest possible level, wherein said lowest possible level is one of a wireless sensor node, a communication management unit, a powered wireless gateway or data processing platform wherein all data needed to make a relevant determination of the state of the railcars are present.

5. The rail yard management system of claim 3 wherein said data processing platform further comprises:
a temporal analysis module to determine changes in said data over time; and
a spatial analysis module to determine the relative positions of objects.

6. The rail yard management system of claim 3 wherein said data processing platform further comprises a rules engine performing the functions of:
storing operating parameters for said railcars; and
comparing data collected from said temporal analysis and spatial analysis modules to said operating parameters.

7. The rail yard management system of claim 6 wherein said rules engine further performs the functions of:
evaluating data collected from said temporal analysis and spatial analysis modules based on a set of pre-defined rules; and
based on said evaluation, determining data that is critical to be communicated to off-system.

8. The rail yard management system of claim 6 wherein said critical data is communicated off-system to an integration platform where operational decisions are made based on said determination made by said rules engine.

9. The rail yard management system of claim 1, wherein said operational parameters further include information regarding one or more of the following for at least one of said railcars:
the position of a hatch;
the status of a handbrake;
the empty/full status of said railcar;
the location of said railcar within said rail yard; and
a temperature of commodities contained in said railcar.

10. The rail yard management system of claim 4 wherein said lowest possible level is one of a wireless sensor node, a communication management unit, a powered wireless gateway or data processing platform wherein all data needed to make a relevant determination of the status of an operational parameter of a railcar is present.

11. The rail yard management system of claim 2 further comprising at least one wireless sensor node located on said railcar and which includes at least one of said sensors, said wireless sensor node capable of communicating wirelessly with said communication management unit.

12. A rail yard management system comprising:
(a) a rail yard-based mesh network comprising one or more land-based wireless gateways that are installed at fixed locations in a rail yard;
(b) at least one railcar having a railcar-based mesh network overlaid thereon comprising a communication management unit disposed on said railcar;
(c) one or more sensors positioned on said railcar configured for sensing an operational parameter of said railcar, said sensors capable of communicating with said communication management unit; and
(d) wherein said communication management unit acts as a node in said rail yard-based mesh network when said railcar is within said rail yard so that information regarding the operational parameter being sensed can be communicated to said one or more land-based wireless gateways;
wherein the operational parameter comprises both forces experienced by said railcar during coupling and a weight of commodities loaded on said railcar.

13. The rail yard management system of claim 12 further comprising a data processing platform able to draw conclusions regarding the state of said railcars based on said collected data.

14. The rail yard management system of claim 13 wherein said data processing platform includes a distributed event engine which distributes decision-making based on said data to the lowest possible level.

15. The rail yard management system of claim 12 wherein said data is communicated off-system to an application for creating human-readable alerts and reports based on said data.

16. The rail yard management system of claim 12, wherein said operational parameter further includes information regarding one or more of the following:
the position of a hatch;
the status of a handbrake;
the empty/full status of said railcar;
the location of said railcar within said rail yard; and
a temperature of commodities contained in said railcar.

17. The rail yard management system of claim 12 wherein said communication management unit includes at least one of said sensors.

18. The rail yard management system of claim 12 further comprising a wireless sensor node which includes at least one of said sensors, said wireless sensor node capable of communicating wirelessly with said communication management unit.

19. A yard management system for managing one or more vehicles within a yard, each of which vehicles having a vehicle based mesh network overlaid thereon, comprising:
a yard-based mesh network having one or more land-based wireless gateways that are installed at fixed locations in the yard; and
said yard management system configured for performing the following functions:
(a) allowing one or more communication management units associated with said one or more vehicles to become nodes in said yard-based mesh network when said vehicles are within said rail yard;
(b) collecting data from said one or more communication management units through said rail yard-based mesh network; and
(c) determining the state of various operational parameters of said vehicles from said collected data;

wherein the various operational parameters comprise both forces experienced by said railcar during coupling and a weight of commodities loaded on said railcar.

20. The yard management system of claim 19 wherein said communication management units on each of said vehicles collect data from one or more wireless sensors on their respective vehicles and relay said data to said system, each of said sensors being positioned on its respective vehicle to collect data regarding at least one of said operational parameters.

* * * * *